United States Patent
Bello et al.

(10) Patent No.: US 6,971,425 B2
(45) Date of Patent: Dec. 6, 2005

(54) TIRE FOR HIGH-PERFORMANCE VEHICLES AND PREMOULDED TREAD BAND HAVING AN ASYMMETRICAL PATTERN

(75) Inventors: Vito Bello, Monza (IT); Gianfranco Colombo, Concorrezzo (IT); Pierangelo Misani, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 138 days.

(21) Appl. No.: 10/148,471

(22) PCT Filed: Nov. 29, 2000

(86) PCT No.: PCT/EP00/11899

§ 371 (c)(1),
(2), (4) Date: Sep. 20, 2002

(87) PCT Pub. No.: WO01/39997

PCT Pub. Date: Jun. 7, 2001

(65) Prior Publication Data

US 2003/0121580 A1    Jul. 3, 2003

Related U.S. Application Data

(60) Provisional application No. 60/187,392, filed on Mar. 7, 2000.

(30) Foreign Application Priority Data

Dec. 1, 1999    (IT)    .............................. MI99A2514

(51) Int. Cl.$^7$ ........................ B60C 11/03; B60C 11/13; B60C 111/00
(52) U.S. Cl. ................ 152/209.8; 152/209.9; 152/209.18; 152/209.25; 152/209.26; 152/209.27; 152/209.28
(58) Field of Search .......................... 152/209.8, 209.9, 152/209.18, 209.25, 209.26, 209.27, 290.28

(56) References Cited

U.S. PATENT DOCUMENTS 3,682,220 A * 8/1972 Verdier .................. 152/209.26

(Continued)

FOREIGN PATENT DOCUMENTS

EP    565270    * 10/1993

(Continued)

OTHER PUBLICATIONS

Akaishi Koji, "Pneumatic Tire", Patent Abstracts of Japan, of JP 10138712, May 26, 1998.

(Continued)

*Primary Examiner*—Steven D. Maki
(74) *Attorney, Agent, or Firm*—Finnegan, Henderson, Farabow, Garrett & Dunner, L.L.P.

(57) ABSTRACT

A tire for a vehicle wheel includes a carcass structure, a belt structure, and a tread band. The tread band pattern includes a central zone and two axially-opposite shoulder zones. The central zone is delimited between axially-inner circumferential grooves and includes at least two intermediate circumferential grooves and a plurality of first transverse recesses inclined relative to a circumferential direction of the tire. The first transverse recesses are connected to at least one of the intermediate circumferential grooves. The shoulder zones are each delimited between axially-inner and axially-outer circumferential grooves. The shoulder zones include a plurality of second transverse recesses inclined relative to the circumferential direction. The at least one of the intermediate circumferential grooves includes a substantially V-shaped cross-section. A width and depth of the at least one of the intermediate circumferential grooves are greater than and less than, respectively, a width and depth of the first transverse recesses.

35 Claims, 2 Drawing Sheets

U.S. PATENT DOCUMENTS

| | | | |
|---|---|---|---|
| 4,947,911 A | | 8/1990 | Ushikubo et al. |
| 5,327,952 A | * | 7/1994 | Glover et al. .......... 152/209.26 |
| 5,658,404 A | * | 8/1997 | Brown et al. .......... 152/209.26 |
| D405,732 S | * | 2/1999 | Johenning et al. ......... D12/567 |
| 6,450,223 B1 | * | 9/2002 | Landers et al. ........ 152/209.26 |
| 2002/0092591 A1 | * | 7/2002 | Cortes ................... 152/209.18 |

FOREIGN PATENT DOCUMENTS

| | | | |
|---|---|---|---|
| FR | 2317112 | | 2/1977 |
| JP | 64-28009 | * | 1/1989 |
| JP | 4-95504 | * | 3/1992 |
| JP | 5-319026 | * | 12/1993 |
| JP | 6-239110 | * | 8/1994 |
| JP | 9-136514 | * | 5/1997 |
| JP | 11-189011 | * | 7/1999 |
| WO | WO9825776 | | 6/1998 |
| WO | WO9916631 | | 8/1999 |

OTHER PUBLICATIONS

Ito Tatsuya, "Pneumatic Tire for Two Wheeler", Patent Abstracts of Japan, of JP 07323706, Dec. 12, 1995.

* cited by examiner

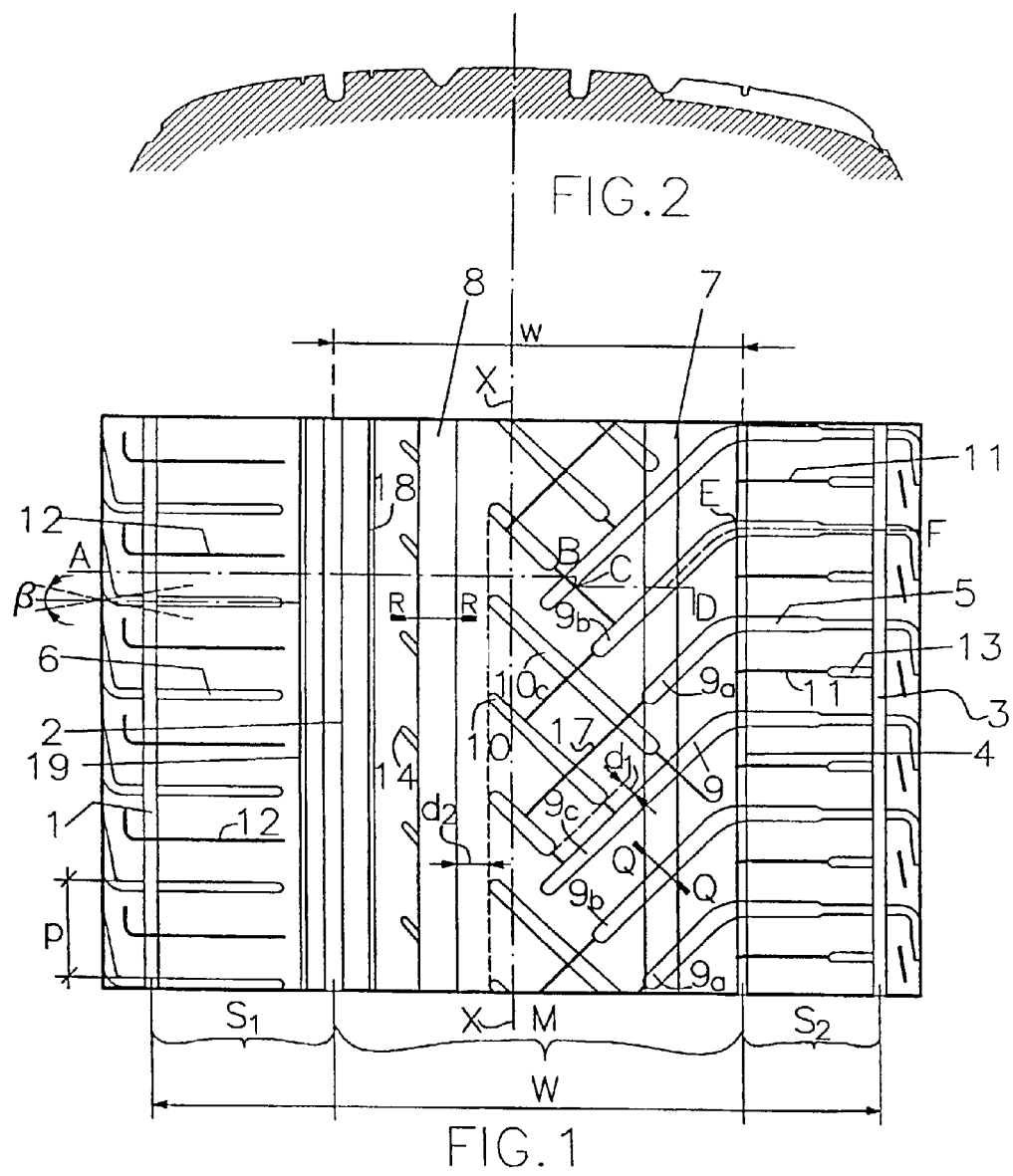

TIRE FOR HIGH-PERFORMANCE VEHICLES AND PREMOULDED TREAD BAND HAVING AN ASYMMETRICAL PATTERN

CROSS-REFERENCE TO RELATED APPLICATIONS

This application is a national stage entry under 35 U.S.C. § 371 from International Application No. PCT/EP00/11899, filed Nov. 29, 2000, in the European Patent Office, the contents of which are relied upon and incorporated herein by reference; additionally, Applicants claim the right of priority under 35 U.S.C. § 119(a)–(d) based on patent application No. MI99A002514, filed Dec. 1, 1999, in the Italian Patent Office; further, Applicants claim the benefit under 35 U.S.C. § 119(e) based on prior-filed, provisional application No. 60/187,392, filed Mar. 7, 2000, in the U.S. patent and Trademark Office.

BACKGROUND OF THE INVENTION

1. Field of the Invention

The invention relates to a tyre for motor vehicles, especially to a tyre with a radial carcass for medium and high class cars which require tyres capable of a high performance. In particular the invention relates to the tread pattern of the above mentioned tyres.

2. Description of the Related Art

A radial tyre, in its most general form, comprises a carcass structure including a central crown portion and two axially opposite sidewalls terminating in a pair of beads for fixing onto the rim of a wheel, a belt structure coaxially associated with the carcass structure and a tread band extending coaxially around the belt structure.

The thickness of the tread band has, formed in it, a raised pattern formed by a plurality of transverse and longitudinal grooves which overall produce a plurality of ribs and/or blocks distribuited with varying configurations.

The characteristics which the tyres according to the invention must satisfy, in view of the high speed of the vehicle, are mainly a high directional stability, excellent grip properties both on straight sections and around bends as well as on dry ground and on wet ground, silent travel and good wear resistance.

Achieving all these characteristics simultaneously on the same tyre is a problem which is difficult to solve in that each of these characteristics requires measures which have negative consequences on the other characteristics.

As regards the directional stability and the wear resistance, the difficulty of fully satisfying the abovementioned requirements is essentially related to the difficulty of limiting the mobility of the blocks (this term being understood as referring to the tread band portions delimited between pairs of consecutive recesses both in the axial direction and in the circumferential direction) present on the tread band, when there are high stresses, and their deterioration as said blocks gradually heat up during use.

In tyres of the known type, in fact, the blocks present on the tread band, during the tyre travel movement, are subject to a whole series of thermo-mechanical stresses, which are mainly due to heating, as result of friction, of the rubber compound, and to the compressive and shearing forces which tend to bend and deform the blocks, modifying the geometrical form thereof: this almost invariably results in a deterioration in the performance of the tyre after a certain degree of wear of the tread band, which is correspondingly more rapid and irregular the more driving is performed in "limit" conditions.

One way of attempting to overcome these difficulties consists in minimizing the number of blocks and reinforcing their structure by providing the tread pattern with a high solid/void ratio: tyres of this type are already known in the art.

An example of this known art is described in the patent WO9825-776 which refers to a tyre comprising a tread band which is devoid of circumferential grooves, but is provided with transverse recesses which are varyingly oriented, being respectively inclined in both the axial and the circumferential directions in the central zone, astride the equatorial plane, and with an axial extension in the shoulder zones, so as to define a tread pattern of the directional type, i.e. having a preferred direction of rotation.

The presence of transverse grooves is necessary to ensure the tractional power of the tyre, and their efficiency with regard to the tractional power is all the greater the more the inclination of the abovementioned grooves approaches the axial direction: on the other hand, this axial inclination has a negative effect as regards the capacity for draining the water accumulating underneath the contact patch area and as regards the directional stability of the tyre, in particular at high speeds.

In fact, these treads, precisely owing to the absence of circumferential grooves, are highly susceptible to the phenomenon of "aquaplaning" which cannot be tolerated in the tyres according to the invention in view of the required performance. Circumferential grooves are therefore also necessary.

Furthermore, these grooves also, with the increase in the performance required of the tyres in terms of power and speed, give rise to a series of problems, in particular in radial-carcass tyres.

Firstly, the structural strength of the belt is restricted overall by the fact that, in the region of said grooves, where the thickness of the tread is obviously limited to a minimum value, the belt has a preferential deformation zone, i.e. a "hinge". This hinge, when the tyre during use has a very steep slip angle, generates a type of stress which causes the dynamic failure of the belt structure, with an associated deterioration in the road-holding power and the behavioural properties generally of the tyre, and therefore of the vehicle at high speeds.

In addition to this, during travel of the vehicle around bends, the contact with the ground causes flexing of the outer edge, of the circumferential grooves, with reference to the direction of travel, lowering it radially inwards and displacing it axially inwards, narrowing the groove and exposing the inner edge of the latter to a cyclical tangential stress which is repeated with every rotation of the wheel, causing typical irregular and early wear, which is known as "sawtooth wear".

This wear modifies the optimum profile of the tyre in the meridian plane, viewed in right cross section, with negative effects on the directional stability and on the comfort of the tyre.

In addition this modification of the tyre profile is not constant, and therefore not predictable and rectifiable with suitable geometrical configurations of the vulcanization mould: in fact, the degree and the speed of propagation of this wear vary with the variation in the speed of the vehicle, and therefore the centrifugal force applied to the crown portion in the contact patch area, and with the residual depth of the groove.

The current technology does not offer any teachings in order to solve entirely the problem of providing a tyre for high and very high performance vehicles, able to ensure at the same time a minimum and more uniform wear of the tread band during the rolling movement of the tyre, a high directional stability and improved resistance to aquaplaning, providing excellent road-holding power both along straight sections and around bends as well on dry roads and on wet roads, all of which without worsening but, on the contrary, improving the characteristics of low rolling resistance, silent travel and good driving performance in any travel conditions.

SUMMARY OF THE INVENTION

The Applicants have now found that the problem could be brilliantly solved by means of a tread band having a plurality of transverse recesses, which are inclined with respect to both the axial and the circumferential direction at least in the central portion of said band, in combination with a plurality of circumferential grooves, at least one of which being intersected by at least some of said transverse recesses and having a V-shaped right cross section with a width greater than and depth less than those of the transverse recesses which intersect it.

The Applicants have found that the effectiveness of the solution was greatly influenced by the value of the ratios between the homologue geometrical dimensions of said transverse recesses and the circumferential grooves intersected, which are therefore of critical importance for the invention.

The Applicants have also found that the preferred solution consisted in arranging, in the central zone of the tread, said plurality of transverse recesses distributed as two series which are arranged axially opposite each other and circumferentially intercalated with each other. More particularly, in the central zone of the above mentioned tread band, these transverse recesses are distributed in groups; more specifically, each series comprises groups of three recesses which are parallel to each other and have different lengths and alternate with groups of three recesses which are parallel to each other, have different lengths and belong to the opposite series.

In each group the recesses have a length decreasing in the same direction of rotation of the tyre and such that the longest recess has a length three to four times greater than that of the shortest recess.

Furthermore the Applicants have found that it was possible to optimize the solution by providing the central zone of the tread band with particular geometrical characteristics variable along the axial extension of said zone, so as to obtain a synergic effect with the characteristics of the adjacent shoulder zones, which is able to improve the whole performance range of the tyre during use.

According to a first aspect thereof, the invention therefore relates to a tyre for vehicle wheels comprising: a carcass structure including a central crown portion and two axially opposite sidewalls terminating in a pair of beads for fixing the tyre onto a corresponding wheel rim, a belt structure, which is coaxially associated with the carcass structure, and a tread band, coaxially extending around the belt structure and moulded with a raised pattern on which two axially opposite shoulder zones are defined, each delimited between a pair of respectively axially outer and axially inner circumferential shoulder grooves, said shoulder zones comprising a plurality of transverse recesses which are inclined with respect to the circumferential direction of the tyre, and a central zone delimited between the axially inner grooves of said pair of circumferential shoulder grooves and comprising at least two intermediate circumferential grooves, and a plurality of transverse recesses which are inclined with respect to the circumferential direction, intersecting at least one of said intermediate grooves, characterized in that at least the intermediate circumferential groove intersected by said plurality of transverse recesses has, in right cross section along a radial plane, a V-shaped profile with its vertex in a radially inner position, having a width greater than and depth less than those of the right cross section of said transverse recesses.

Preferably the value of the ratio between the depth of said V-shaped groove and that of the transverse recesses which intersect it is between 0.35 and 0.82, while the value of the ratio between the width of said V-shaped groove and that of the transverse recesses which intersect it is between 1.5 and 5.

Even more preferably, the width of said V-shaped groove is between 10 and 15 mm, while the depth of said V-shaped groove is between 3 and 7 mm.

As regards the shape of said V-shaped section, the angle $\alpha$ of inclination of the sidewalls of said groove with respect to the axial direction is preferably between 35° and 55°.

Preferably said transverse recesses have a U-shaped right cross section and the areas of the right cross section of the V-shaped groove and the right cross section of the U-shaped recesses are equal to each other.

Preferably said U-shaped transverse recesses have a width of between 3 and 10 mm and a depth of between 7 and 8.5 mm.

Even more preferably, the transverse recesses of said central zone comprise two series of recesses which are respectively inclined on opposite sides with respect to the axial direction, at an angle of inclination with respect to the circumferential direction which is between 30° and 60°, and preferably substantially equal 45°; each of said series comprises a circumferential succession of groups of recesses which are interspaced with groups of recesses of the other series. Preferably, in each series, said groups of recesses comprise three recesses which are parallel with each other.

In accordance with a preferred configuration, advantageous for improving the tractional and silent-travel properties of the tyre, the transverse shoulder recesses are perpendicular to the equatorial plane of the tyre and are circumferentially staggered with those of the opposite shoulder.

BRIEF DESCRIPTION OF THE DRAWINGS

Further characteristic features and advantages will emerge more clearly from the description which follows of two preferred examples of embodiment of a tyre according to the invention, with reference to the accompanying drawings, provided solely by way of a non-limiting example, in which:

FIG. 1 shows a plan view of the pattern formed in the tread band of a tyre according to the invention, in a first embodiment;

FIG. 2 shows a partial view of the tyre, in particular the crown portion of said tyre, cross-sectioned along the lines A,B,C,D,E,F of FIG. 1;

DETAILED DESCRIPTION OF THE EXEMPLARY EMBODIMENTS

Figures 3, 5:
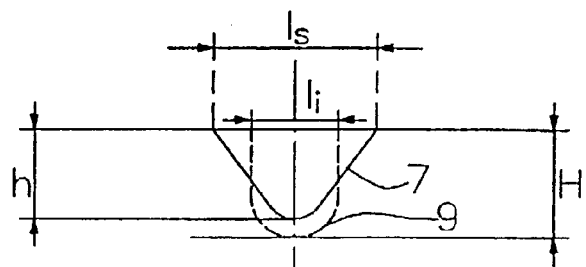
FIG. 3 shows a detail of the right cross sections through a groove and a recess in the tread pattern of the tyre according to FIG. 1, superimposed on each other.
FIG. 5 shows a partial view of the tyre according to FIG. 4, in particular the crown portion of said tyre, cross-sectioned along the lines A,B,C,D.

FIG. 1 illustrates in its entirety the tread pattern of a tyre for high-performance vehicles according to the invention, in particular a tyre with an asymmetrical design intended to be mounted on a vehicle with a preferential direction of travel, with respect to which an outer side and an inner side, or vehicle side, are defined on the tyre.

The tyre traditionally comprises a carcass structure which includes at least one reinforcing ply, the opposite lateral edges of which are associated with corresponding head wires.

The opposite zones of the tyre, each comprising a bead wire with the associated filling, form the so-called beads which are intended for fixing the tyre onto a corresponding mounting rim of a vehicle wheel.

The carcass structure has, coaxially associated with it, a belt structure comprising one or more reinforcing strips each formed by means of a layer of rubber compound incorporating a plurality of textile or metal cords.

The belt structure has, mounted on it, a tread band in which the pattern shown in the above mentioned FIG. 1 is formed.

All the elements described hitherto are not illustrated in that they are by now well-known to the person skilled in the art and essentially irrelevant for the purposes of the invention.

In a first preferred embodiment, the pattern according to the invention (FIG. 1) is divided into three zones, namely into two shoulder zones $S_1$ and $S_2$, which are axially opposite and each delimited between a pair of respectively axially outer (1, 3) and axially inner (2, 4) circumferential shoulders, and a central zone M, which is delimited between the axially inner grooves (2, 4) of said pair of circumferential shoulder grooves. As is well known, the shoulders of the tyres are the end portions of the tread which form the connection between the substantially flat portion of the crown and the sidewalls of the tyre.

The axially outer shoulder grooves, which are also known as interruption recesses, define the width W of the tread and separate the crown portion, i.e. the zone which is normally in contact with the ground in the various travel situations, from the sidewalls of the tyre: the distance w between said grooves 2 and 4 defines the width of the central zone M, which is preferably between 45% and 65% of W. On the inner shoulder $S_2$ the axially inner groove 4 is preferably adjacent to the outer groove 3, i.e. this shoulder does not have further circumferential grooves; on the other hand, the outer shoulder $S_1$ is preferably provided with a circumferentially continuous incision 19 adjacent to the inner groove 2.

It is pointed out here that all the measures indicated are understood as referring to new tyres, which are mounted on the recommended rim and inflated to their working pressure, in particular, the pattern according to FIG. 1 refers to a tyre size 225/40 ZR 18.

The outer shoulder grooves 1 and 3 have the same depth, of 1.5 mm, and the same width, of 4 mm, while the inner grooves, depending on the asymmetry of the tread pattern, are different from each other; in particular they have a different width, of 2.5 mm for the groove 4, and a width of greater value, i.e. 8 mm for the groove 2.

Therefore the above mentioned grooves may also be identical to each other and, in any case, their width is preferably between 1.5 mm and 12 mm, while their depth is preferably between 1.5 mm and 8.5 mm. As illustrated in FIG. 1, these grooves are preferably rectilinear.

Each shoulder zone comprises a plurality of transverse shoulder recesses 5, 6 which are substantially perpendicular to the circumferential direction of the tyre: the recesses 5 have a width of 6.2 mm, while the recesses 6 have a width of 4.8 mm.

Said transverse recesses have the function of producing the maximum tractional power of the tyre: in this connection the inclination β of said recesses with respect to the axial direction is preferably in the region of about 30°.

In the example shown, the recesses 5 become narrower at about two thirds of the way along their length, extending axially outwards, assuming a width of 3 mm; both the transverse recesses 5 and 6 have a constant depth, of 8 mm. More generally, their width is preferably between 2 and 10 mm, and their depth is preferably the same at the corresponding inner groove, between 4 and 10 mm, decreasing in the axial direction outwards.

In the embodiment shown, the recesses 5 open out into both the shoulder grooves 3 and 4, while the recesses 6 are blind at their axially inner ends. Moreover, each shoulder also comprises a plurality of sipes (incisions with a width of not more than 1 mm) which are circumferentially intercalated with the transverse recesses and are substantially parallel to said recesses. The sipes 11 intercalated with the recesses 5 open out into both the grooves 3 and 4 and may also extend beyond the above mentioned groove 4; those sipes (12) intercalated with the recesses 6, in a similar manner to the latter, are blind at their axially inner ends. It is pointed out here that this fact does not exclude the possibility, both for the recesses and for the sipes in each shoulder, of opening out into both the shoulder grooves or having one or both the ends which are blind.

In a preferred embodiment the sipes 11 open out axially outwards into a cavity 13 having a width not greater than the maximum width of the recesses 5 and preferably coaxial with said sipes.

Advantageously, as can be noted in the embodiment shown in FIG. 1, the transverse recesses of a shoulder are circumferentially staggered with those of the opposite shoulder by an amount equal to about 50%, of the interval between said transverse recesses. In this connection it should be pointed out that, in a tyre, the tread pattern generally comprises an axial portion which identically repeats itself a predefined number of times along the circumferential extension of the tyre. The circumferential extension of said portion forms the interval of the pattern. Generally a tread pattern has an interval "p" which is variable circumferentially in accordance with alternating intervals (interval sequence) of varying (two or more) lengths, for example a long interval and a short interval.

The circumferential distance between two adjacent homologue transverse recesses forms the interval "p" of the pattern according to the invention, which envisages intervals with a length of between 27 mm and 40 mm over circumferential sections of the tyre, measured along the equatorial plane on the outer surface of the tread band, of between 1850 and 2200 mm.

The central zone M comprises two intermediate circumferential grooves 7, 8, which are situated preferably on opposite sides of the equatorial plane X—X, and a plurality of central transverse recesses which are inclined with respect to the circumferential direction, some of which intersecting one of said intermediate grooves, i.e. the groove 7 in the example shown.

In the embodiment illustrated, the above mentioned plurality of recesses comprises two separate series of transverse recesses, which are mutually oriented in the opposite direction with respect to the circumferential direction of the tyre and are preferably perpendicular to each other. The first series comprises recesses 9, which are arranged in succession in the circumferential direction, all parallel with each other, extending from the inner shoulder groove 4 towards the equatorial plane.

These recesses all emerge in the above mentioned groove 4 and are arranged in succession circumferentially in groups of three, where the first recess (9*a*) of the group terminates in the circumferential groove 7, the second recess (9*b*) passes through said groove 7 and stops at a distance from this groove substantially equal to the distance between the groove 7 and the groove 4, and the third recess (9*c*) passes through the groove 7 and stops substantially on the equatorial plane.

All the recesses 9 are located facing the recesses 5, forming an extension thereof in the axially inner direction, and are inclined at an angle γ of 45° with respect to the circumferential direction.

In the preferred embodiment shown, the recesses 5 and 9 are rectilinear and joined together by means of a curved section, preferably an arc of a circle, with a radius of curvature of between 30 and 60 mm.

The second series comprises recesses 10 which are arranged in succession in the circumferential direction, all being parallel with each other, extending between said pair of intermediate grooves 7 and 8, also oriented at 45° with respect to the circumferential direction, but in the opposite sense with respect to the recesses 9 of the first series.

In the pattern shown, said recesses are also arranged circumferentially in succession in groups of three, interspaced with the groups of recesses of the first series; in each group the recesses have a different length substantially in a ratio of 1:2:3. The longest recess (10*c*) emerges inside the circumferential groove 7, while the other two (10*a*, 10*b*) are blind recesses, the ends of which directed towards the groove 7 are aligned on a straight line parallel to the axis of the recesses 9, located at a distance $d_1$ of not less than 5 mm from the recess.

The opposite ends, which are directed towards the groove 8, are aligned along a circumferential straight line parallel to said groove 8 and located at a distance $d_2$ therefrom of also not less than 5 mm.

Figure 4:
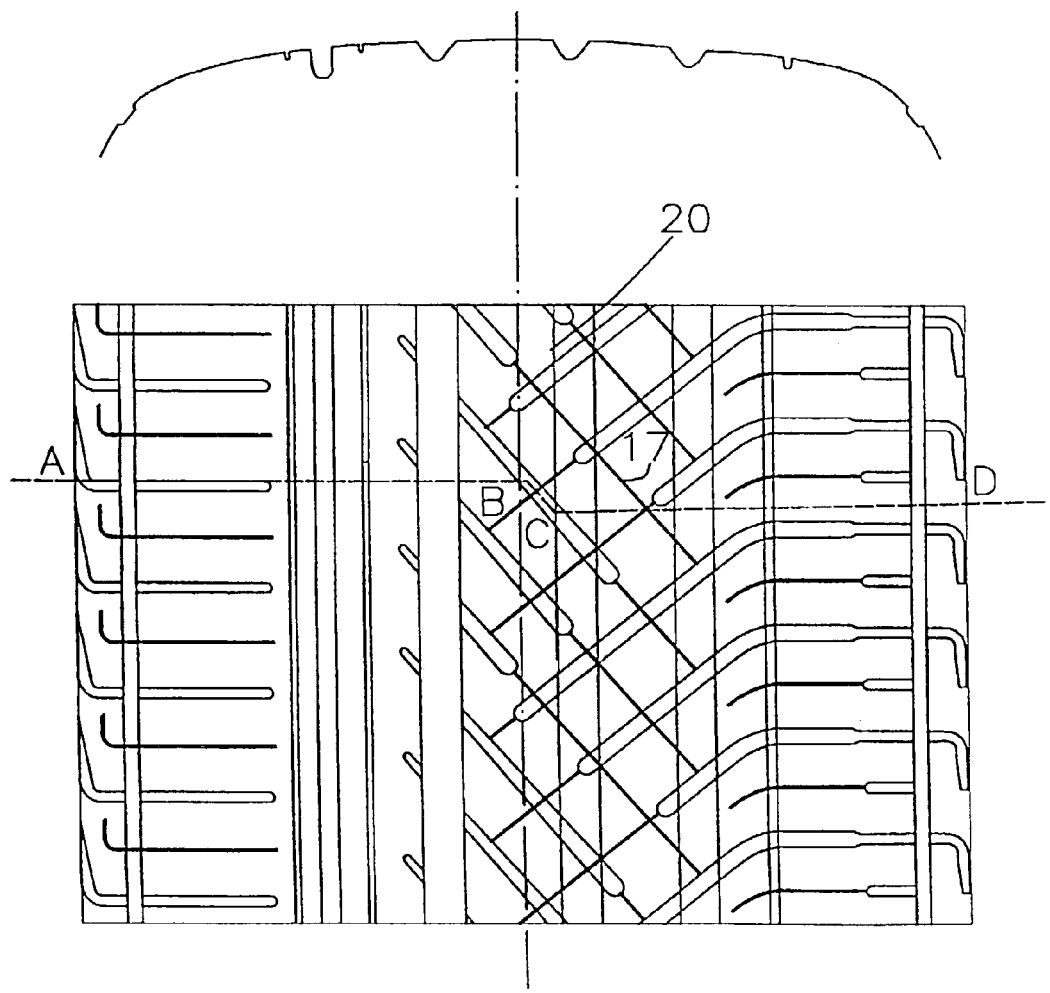
FIG. 4 shows a plan view of the pattern formed in the tread band of the tyre according to the invention, in a second embodiment.

Alternatively, as can be seen with reference to the embodiment according to FIG. 4, all or at least some of the ends of the recesses 10 directed towards the groove 8 may emerge inside this groove. The groove 8 has, extending from its axially outer edge, notches 14 inclined in the manner of the recesses 10 and preferably also coaxial with said recesses, forming an extension thereof towards the outer side of the tread. In this case, the ratio between the lengths of said recesses is equal to about 2:3:4. Preferably the above mentioned recesses have an increasing width, in the direction towards the inner edge of the tread, i.e. the edge on the vehicle side.

It is pointed out here that the number of recesses in each group of each series may range between 1 and 5, being preferably equal to 3, and that their orientation with respect to the circumferential direction is preferably between 30° and 60°. Moreover, the value of the angle between the axes of said recesses 9 and 10 may vary by more or less 15° with respect to the above mentioned perpendicular direction.

It is pointed out here that the above description of the tread pattern is not to be regarded as limiting in any way since the number, dimensions and positions of the above mentioned transverse recesses may vary with respect to that indicated, within the range of the values indicated above.

In order to favour the travel comfort provided by the tyre, an additional circumferentially continuous and rectilinear incision 18 is advantageously provided between the inner shoulder groove 2 and the axially outer edge of the groove 8, said incision being the identical counterpart of the incision 19 and dividing the corresponding rib into two narrower ribs arranged alongside each other.

In the preferred embodiment shown in FIG. 1, sipes 17 extend from the blind ends of at least some of the recesses 9 and 10, said sipes being coaxial with said recesses and extending away from the recess until they meet the last recess of the opposite group prior to the adjacent circumferential groove.

FIG. 2 shows a right cross section through the tread according to FIG. 1, along the sectional planes indicated by ABCDEF, and no further comments are required in view of the explanations already provided.

FIG. 3 shows the right cross section R—R through the grooves 7, 8 and the right cross section Q—Q through a recess 9, which are superimposed on each other in the same plane, with their respective axes and their profiles being made to coincide with each other the region of the radially outer surface of the tread. The groove 7 has a V-shaped section with the rounded vertex directed radially inwards, a width is of 13 mm, preferably ranging between 10 and 15 mm, and a depth h of 6 mm, preferably ranging between 3 and 7 mm.

On the other hand, the recess 9 has a U-shaped section with a width li of 10 mm, preferably ranging between 3 and 10 mm, and a depth H of 8 mm, preferably ranging between 8.5 and 7 mm. Preferably, the two right cross sections have the same area A, the value of which is expressed in $mm^2$.

The recesses 10 also preferably have a U-shaped right cross section with a width and depth equal to or less than those of the recesses 9.

The value of the angle α between the inclination of the sides of the groove and the axial direction is equal to 45°, and preferably between 35° and 55°: in this connection, the sides of the V-shaped grooves may have inclinations which are different from one another. The intermediate circumferential grooves are also preferably continuous and rectilinear.

FIG. 4 shows the tyre according to the invention in a constructional variation with respect to that of FIG. 1, intended for larger size tyres, i.e. with a greater tread width. In particular the pattern relates to a tyre of size 265/35 ZR 18.

The measurements shown refer, for example, to the fitting-out of the vehicle model, PORSCHE 996, where the larger size tyres are mounted on the rear tractive driving axle.

The two patterns have characteristics which are common so that similar elements in the two patterns retain the same reference number, and the following description will highlight only the differences.

It is pointed out here that the patterns described are not limiting with respect to the size of the tyre since both the patterns may be formed on the tread of both tyres.

Firstly, the central zone comprises a third central circumferential groove 20, which is substantially identical to the grooves 7 and 8 and is arranged between them: this groove may be arranged along the equatorial plane, but the Applicants have preferred to arrange the groove on the same side, relative to said plane, as the inner side of the tyre so as to differentiate, among the various zones of the tread pattern, the value of the ratio of the voids with 30 respect to the total area. In particular, the pattern according to FIG. 1 has the following values for the above mentioned ratio: shoulder $S_{1=}0.107$, shoulder $S_{2=}0.193$, centre M=0.356. In the pattern according to FIG. 4 the values of said ratio on the shoulders remain substantially unvaried, while in the central part M the value increases to 0.433.

In any case, the values of said void/total area ratio are preferably between 0.1 and 0.2 for the shoulder zones and between 0.25 and 0.45 in the central zone for all the tyres according to the invention.

As regards the lengths of the recesses 10, the three recesses of each group are, in this embodiment, preferably in a relative ratio of 2:3:4 and extend so as to intersect at least the pair of adjacent circumferential grooves 8 and 20.

Moreover, at least some of the sipes 17 extend until they intersect the circumferential groove opposite to the recess of which they form a part.

As regards the shoulders, the difference lies substantially in the type and number of sipes. More than one sipe 12 may be situated on the outer shoulder of the tyre, between two circumferentially adjacent transverse recesses, depending on the different length of the pattern interval. The sipes, furthermore, are also blind and their ends directed towards the equatorial plane are located on the same straight line which aligns the ends of the recesses.

The shoulder on the vehicle side may also have more than one sipe 11 between two circumferentialy adjacent transverse recesses, depending on the different length of the pattern interval, and the abovementioned sipes extend beyond the circumferential groove 4 without, however, emerging inside the groove 7. Furthermore, when the sipes 11 are arranged in pairs on the same block defined between two transverse recesses 5, none of them forms the extension of the notch 13, but this notch 13 is located circumferentially interspaced with said pair of sipes.

FIG. 5 shows a right cross section through the tread according to FIG. 4, along the sectional plane indicated by ABCD, and is such that no further comments are required following the explanations already given.

Numerous advantages may be achieved as a result of the present invention.

The presence of the wide V-shaped circumferential grooves in the central portion of the crown of the tyre provides excellent drainage of the water in the contact patch area, ensuring continuous contact between tyre and road even at high speeds of the vehicle or when deep areas of water are present. Their V-shaped section solves in particular the known problem of the hinge effect, which is minimized by the presence of a greater thickness of rubber between the bottom of the groove and the surface of the radially outermost belt layer. The absence of hinges along the circumferential extension of the tread results in optimum non-deformability properties of the tread and of the underlying belt structure in the transverse direction, which allow the stresses acting on the contact patch area during travel of the tyre around bends to be effectively withstood.

Their V-shaped section also solves the problem of the sawtooth wear on the edges of the circumferential grooves. In fact, the inclination of the sides of these grooves produces solid edges on the corresponding ribs or blocks which delimit the groove, which edges are unable to flex under the thrust of the tangential forces in the axial direction produced on the contact patch area during travel around bends, owing to the centrifugal force.

Drainage of the water is also ensured by the presence of the plurality of transverse recesses which are distributed over the entire width of the tread. These recesses, on account of their orientation inclined in the circumferential direction, are not only the most effective solution for disposal of the water, which is performed by the circumferential grooves, but may also have a considerable depth, since they do not produce hinge effects on the tread, so that they behave in the manner of a water collection basin prior to drainage.

In other words it may be said that the tyre according to the invention has two combined channelling systems for draining the water, namely a deep-lying system, consisting of the transverse recesses, for collecting the water removed from the contact patch area, and a surface system, consisting of the circumferential grooves for rapid disposal of the water which has been accumulated by both the systems. Critical elements of this double channelling system are the values of the relative dimensional ratios indicated above.

The asymmetrical character of the tread patterns illustrated means that a greater function is performed, in terms of tractional power and water drainage, by the middle zone of the tread which is located on the vehicle side and which therefore has a pattern with a larger quantity of voids than the axially opposite part which is required to perform the function of maximum resistance to wear: in order to ensure good aquaplaning properties, the inner shoulder groove, located on the outer side of the tread, has a greater width than the corresponding inner groove shoulder, located on the inner side of the tread. Advantageously it has been found that the increase in the width of this groove, although increasing the area of the voids in the outer shoulder zone, helps improve the road-holding properties around bends, in particular on wet ground.

A further advantage of the invention arises from the fact that the pattern of the tread band has a high solid-to-void ratio. This property means low specific pressure values in the contact patch area and therefore minor deformations of the blocks of the pattern with consequent generation of less noise.

Advantageously, the shoulders of the tyre, where the greater specific pressure is exerted during travel, has a total quantity of voids which is less than that of the central zone, i.e. there are more solid zones in the centre, with a considerable advantage in terms of silent travel.

An advantageous improvement to the travel comfort of the tyre is obtained, without adversely affecting the longitudinal rigidity of the tread, i.e. the directional stability of the vehicle, and the total quantity of solid areas, by means of the pair of identical thin incisions which have a width ranging between that of the sipes and that of the outer shoulder groove, on the outer side of the tread, and are arranged on opposite sides of said groove.

Finally, the fact of having defined, in the central zone M, a system of transverse recesses which never intersect with each other results in a high capacity of reaction of the tread to the external stress forces.

This aspect may be further clarified by referring to the patterns described above, with particular attention to the orientation of all the recesses both with respect to each other and relative to the equatorial plane.

This having been stated, it must be pointed out that, during travel around bends, the tyre is subject to stresses resulting from the vectorial composition of a force in the direction of travel and a force perpendicular to the equatorial plane, necessary for balancing the centrifugal force.

These resultant stresses have a direction on the tyre which depends both on the resistance properties of the compound forming the tread and on the prevalence of one of the two forces directed in the travel direction and the transverse direction, respectively.

In accordance with the invention, the plurality of oblique solid portions of tread delimited between the pairs of adjacent and mutually parallel transverse recesses forms a network of "struts" which are able to transmit the said resultant stresses alone their axes and, since these oblique portions are substantially perpendicular to the oblique portions delimited by the recesses of the opposite group, the entire system of struts helps to oppose resiliently the stresses acting on the tyre. The person skilled in the art, once the invention as described above has been understood, will now be able to also carry out all those choices, variations and modifications to the variables associated with the invention and necessary for solving the specific technical problem to be dealt with; in particular, said person will have no difficulty in varying the axial position of the circumferential grooves and the inclination of the transverse recesses so as to convert the asymmetrical patterns described and illustrated here into symmetrical or directional patterns, depending on the particular type of use of the vehicle which is to be fitted with the tyres according to the invention.

It must be pointed out that the descriptions of the above mentioned tread patterns must not be regarded as limiting the invention, being only one particular example of the various possible embodiments.

What is claimed is:

1. A tyre for a vehicle wheel, comprising:
   a carcass structure;
   a belt structure; and
   a tread band;
   wherein the carcass structure comprises a central crown portion and two axially opposite sidewalls terminating in beads for mounting the tyre on a corresponding rim of the wheel,
   wherein the belt structure is coaxially associated with the carcass structure,
   wherein the tread band extends coaxially around the belt structure,
   wherein the tread band comprises an asymmetrical pattern, comprising:
      a central zone;
      an inner or vehicle-side shoulder zone; and
      an outer or non-vehicle-side shoulder zone;
   wherein the central zone is delimited between two axially inner circumferential grooves,
   wherein the central zone comprises at least two intermediate circumferential grooves,
   wherein the central zone further comprises a plurality of first transverse recesses that are inclined relative to a circumferential direction of the tyre,
   wherein the first transverse recesses are connected to at least one of the intermediate circumferential grooves,
   wherein the first transverse recesses extend from the axially inner circumferential groove delimiting the inner or vehicle-side shoulder zone toward an equatorial plane of the tyre,
   wherein the shoulder zones are each delimited between respective axially inner and axially outer circumferential grooves,
   wherein the shoulder zones comprise a plurality of second transverse recesses that are substantially perpendicular or inclined relative to the circumferential direction of the tyre,
   wherein the central zone further comprises a plurality of third transverse recesses,
   wherein the third transverse recesses are inclined in a direction opposite, relative to the circumferential direction of the tyre, to the first transverse recesses,
   wherein the third transverse recesses extend between two of the intermediate circumferential grooves,
   wherein the at least one of the intermediate circumferential grooves comprises a substantially V-shaped cross-section,
   wherein a width of the at least one of the intermediate circumferential grooves is greater than a width of the first transverse recesses, and
   wherein a depth of the at least one of the intermediate circumferential grooves is less than a depth of the first transverse recesses.

2. The tyre of claim 1, wherein a value of a ratio of the depth of the at least one of the intermediate circumferential grooves to the depth of the first transverse recesses is between 0.35:1 and 0.82:1.

3. The tyre of claim 1, wherein a value of a ratio of the width of the at least one of the intermediate circumferential grooves to the width of the first transverse recesses is between 1.5:1 and 5:1.

4. The tyre of claim 1, wherein the width of the at least one of the intermediate circumferential grooves is between 10 mm and 15 mm.

5. The tyre of claim 1, wherein the depth of the at least one of the intermediate circumferential grooves is between 3 mm and 7 mm.

6. The tyre of claim 1, wherein an area of the cross-section of the at least one of the intermediate circumferential grooves is substantially equal to an area of a cross-section of the first transverse recesses.

7. The tyre of claim 1, wherein the substantially V-shaped cross-section comprises sides inclined, relative to an axial direction of the tyre, at a first angle between 35° and 55°.

8. The tyre of claim 1, wherein the first transverse recesses comprise a U-shaped cross-section.

9. The tyre of claim 1, wherein the first transverse recesses comprise a width between 3 mm and 10 mm, and
   wherein the first transverse recesses comprise a depth between 7 mm and 8.5 mm.

10. The tyre of claim 1, wherein the first transverse recesses are inclined, relative to the circumferential direction of the tyre, at a second angle between 30° and 60°, and
    wherein the third transverse recesses are inclined, relative to the circumferential direction of the tyre, at a third angle between 30° and 60°.

11. The tyre of claim 10, wherein the second angle is substantially equal to the third angle.

12. The tyre of claim 10, wherein a sum of the second angle and the third angle is between 75° and 105°.

13. The tyre of claim 12, wherein the second angle is substantially equal to the third angle.

14. The tyre of claim 1, wherein the first transverse recesses are arranged in groups,
    wherein the third transverse recesses are arranged in groups, and
    wherein the groups of the first transverse recesses are interspaced with the groups of the third transverse recesses.

15. The tyre of claim 14, wherein the groups of the first transverse recesses each comprise three first transverse recesses, and
wherein the groups of the third transverse recesses each comprise three third transverse recesses.

16. The tyre of claim 14, wherein within the groups of the first transverse recesses, the three first transverse recesses are substantially parallel to each other, and
wherein within the groups of the third transverse recesses, the three third transverse recesses are substantially parallel to each other.

17. The tyre of claim 14, wherein within each group of the first transverse recesses, ends of the first transverse recesses are aligned along a straight line parallel to an adjacent group of the third transverse recesses.

18. The tyre of claim 14, wherein within each group of the third transverse recesses, ends of the third transverse recesses are aligned along a straight line parallel to an adjacent group of the first transverse recesses.

19. The tyre of claim 14, wherein within each group of the first transverse recesses, ends of the first transverse recesses are aligned along a straight line parallel to an adjacent group of the third transverse recesses, and
wherein within each group of the third transverse recesses, ends of the third transverse recesses are aligned along a straight line parallel to an adjacent group of the first transverse recesses.

20. The tyre of claim 14, wherein within the groups of the first transverse recesses, each of the first transverse recesses comprises a different length.

21. The tyre of claim 14, wherein within the groups of the third transverse recesses, each of the third transverse recesses comprises a different length.

22. The tyre of claim 14, wherein within the groups of the first transverse recesses, each of the first transverse recesses comprises a different length, and
wherein within the groups of the third transverse recesses, each of the third transverse recesses comprises a different length.

23. The tyre of claim 1, wherein at least some of the first transverse recesses are connected to a pair of the intermediate circumferential grooves.

24. The tyre of claim 1, wherein at least some of the third transverse recesses are connected to the two of the intermediate circumferential grooves.

25. The tyre of claim 1, wherein the central zone comprises three intermediate circumferential grooves.

26. The tyre of claim 25, wherein each of the three intermediate circumferential grooves comprises a substantially V-shaped cross-section.

27. The tyre of claim 1, wherein the second transverse recesses are inclined, relative to the circumferential direction of the tyre, at a fourth angle between 60° and 120°.

28. The tyre of claim 1, wherein a depth of the second transverse recesses is between 4 mm and 10 mm.

29. The tyre of claim 1, wherein a maximum width of the second transverse recesses is between 2 mm and 10 mm.

30. The tyre of claim 27, wherein the second transverse recesses of at least one shoulder zone are rectilinear and oriented substantially perpendicular to the circumferential direction of the tyre.

31. The tyre of claim 1, wherein the second transverse recesses of at least one shoulder zone are connected to adjacent first transverse recesses of the central zone by a curved section having a radius of curvature between 30 mm and 60 mm.

32. The tyre of claim 1, wherein in at least one of the shoulder zones, a value of a ratio of a void area of the tread band to a total area of the tread band is between 0.1:1 and 0.2:1.

33. The tyre of claim 1, wherein in each of the shoulder zones, a value of a ratio of a void area of the tread band to a total area of the tread band is between 0.1:1 and 0.2:1.

34. The tyre of claim 1, wherein in the central zone, a value of a ratio of a void area of the tread band to a total area of the tread band is between 0.25:1 and 0.45:1.

35. A premoulded tread band for covering worn tyres comprising an asymmetrical pattern, the pattern comprising:
a central zone;
an inner or vehicle-side shoulder zone; and
an outer or non-vehicle-side shoulder zone;
wherein the central zone is delimited between two axially inner circumferential grooves,
wherein the central zone comprises at least two intermediate circumferential grooves,
wherein the central zone further comprises a plurality of first transverse recesses that are inclined relative to a circumferential direction of the tyre,
wherein the first transverse recesses are connected to at least one of the intermediate circumferential grooves,
wherein the first transverse recesses extend from the axially inner circumferential groove delimiting the inner or vehicle-side shoulder zone toward an equatorial plane of the tyre,
wherein the shoulder zones are each delimited between respective axially inner and axially outer circumferential grooves,
wherein the shoulder zones comprise a plurality of second transverse recesses that are substantially perpendicular or inclined relative to the circumferential direction of the tyre,
wherein the central zone further comprises a plurality of third transverse recesses,
wherein the third transverse recesses are inclined in a direction opposite, relative to the circumferential direction of the tyre, to the first transverse recesses,
wherein the third transverse recesses extend between two of the intermediate circumferential grooves,
wherein the at least one of the intermediate circumferential grooves comprises a substantially V-shaped cross-section,
wherein a width of the at least one of the intermediate circumferential grooves is greater than a width of the first transverse recesses, and
wherein a depth of the at least one of the intermediate circumferential grooves is less than a depth of the first transverse recesses.

* * * * *

UNITED STATES PATENT AND TRADEMARK OFFICE
CERTIFICATE OF CORRECTION

PATENT NO. : 6,971,425 B2
DATED : December 6, 2005
INVENTOR(S) : Vito Bello et al.

It is certified that error appears in the above-identified patent and that said Letters Patent is hereby corrected as shown below:

Title page,
Item [54], Title, should read -- TIRE FOR HIGH- PERFOMANCE VEHICLES HAVING ASYMMETRICAL PATTERN --.

Column 13,
Line 6, "claim 14," should read -- claim 15, --.

Signed and Sealed this

Twenty-eighth Day of March, 2006

JON W. DUDAS
*Director of the United States Patent and Trademark Office*